Dec. 26, 1939. L. ROSEMAN 2,184,650
LOCKING SEPARABLE FASTENER
Filed Feb. 26, 1938 3 Sheets-Sheet 1
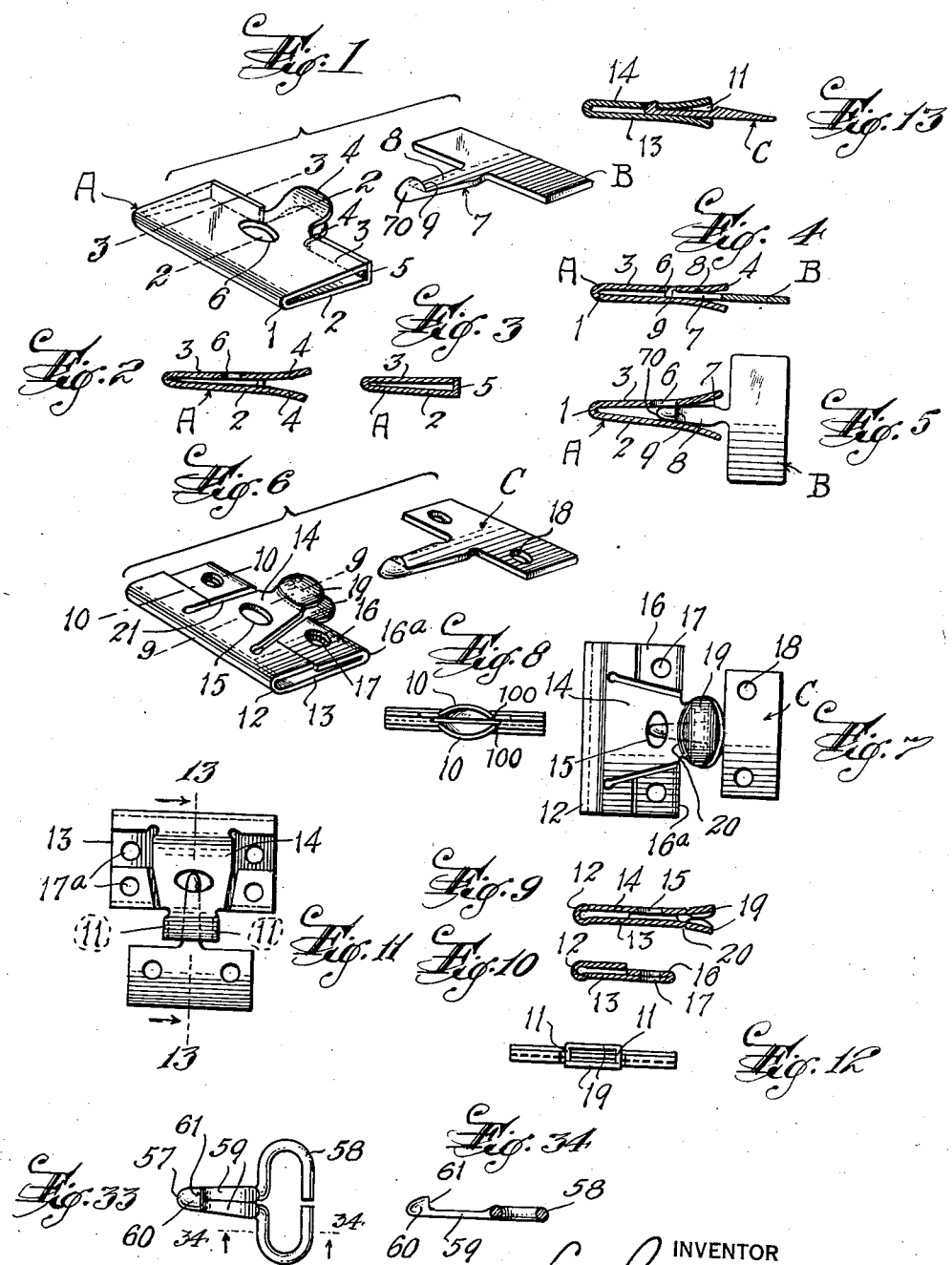
INVENTOR
Leo Roseman,
BY
Harry B. Cook,
ATTORNEY

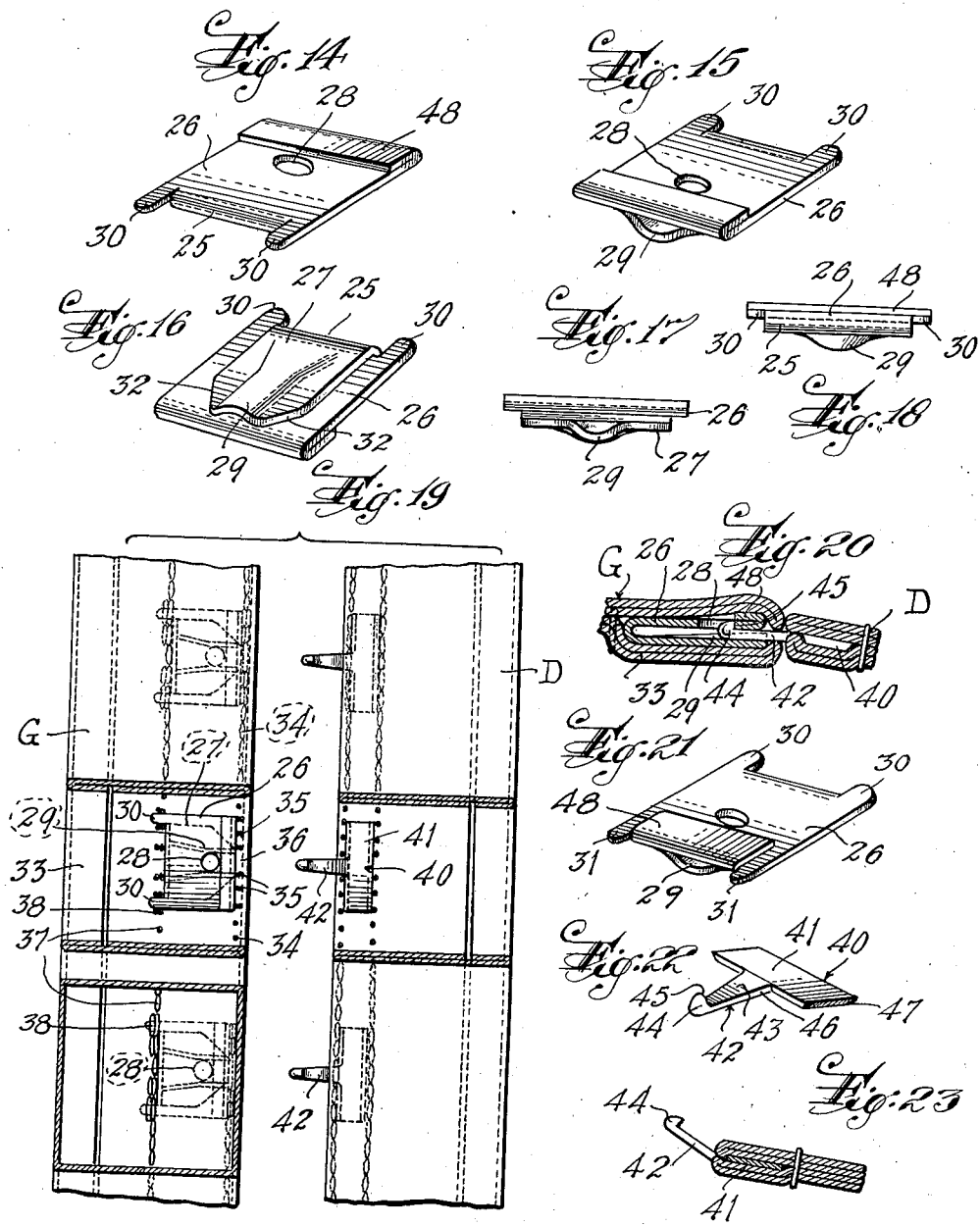

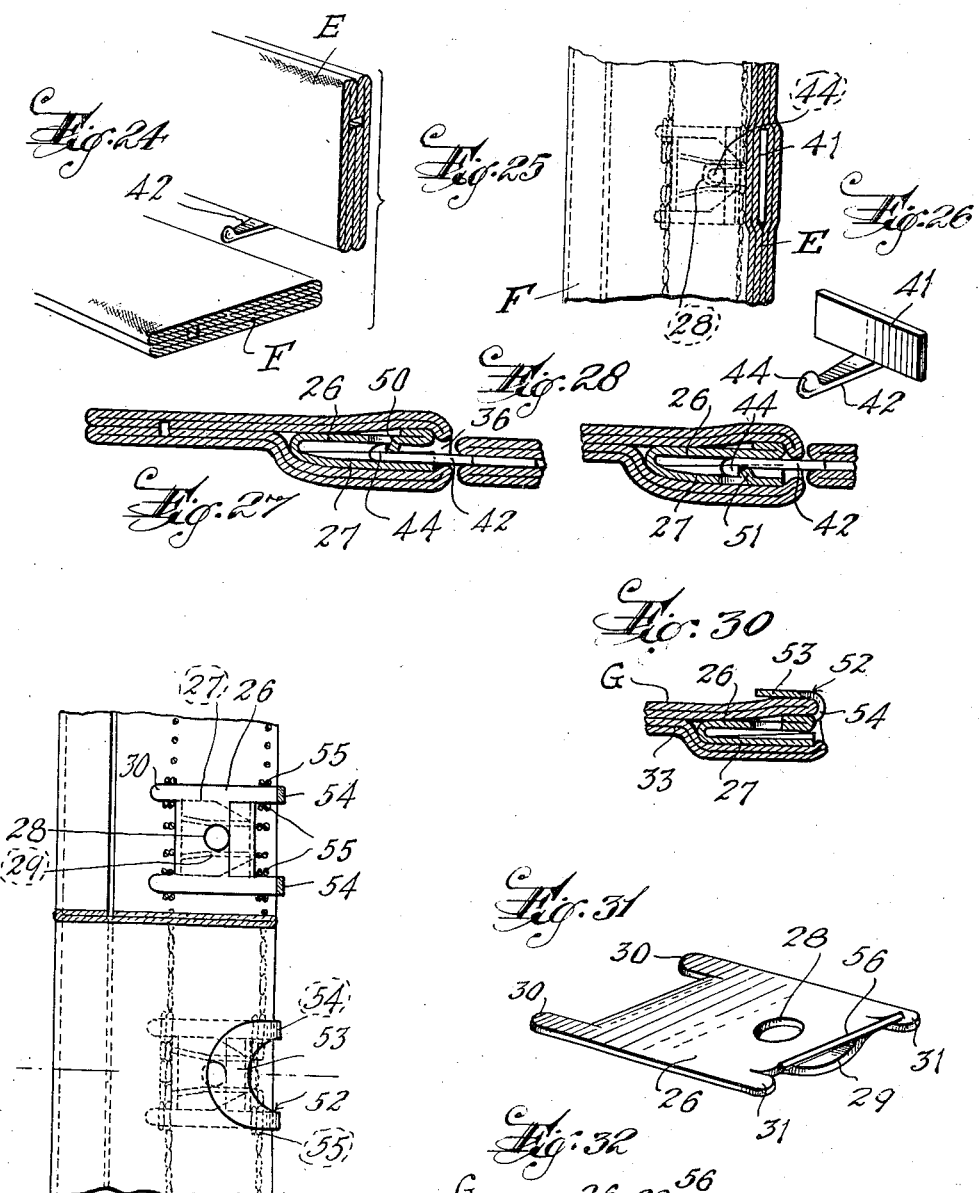

Patented Dec. 26, 1939

2,184,650

UNITED STATES PATENT OFFICE 2,184,650

LOCKING SEPARABLE FASTENER

Leo Roseman, Newark, N. J.

Application February 26, 1938, Serial No. 192,702

10 Claims. (Cl. 24—230)

This application is a continuation in part of my co-pending application Serial No. 108,792, filed November 2, 1936, and also includes the stud and socket fastener elements per se that are disclosed in my co-pending application Serial No. 156,069, filed July 28, 1937, and United States Patents No. 2,114,429 dated April 19, 1938, and No. 2,114,431 dated April 19, 1938.

This invention relates in general to separable fasteners of the stud and socket type, and particularly to such fasteners especially adapted for use on garments such as corsets, brassières, shirts and leggings, or on other articles such as garment bags, draperies and the like.

There are four common forms of separable fasteners. One type is a hook and eye wherein the common plane of the shank and the bill of the hook as well as the axis of the eye are perpendicular to the general plane of the edges of the article being connected and the hooks and eyes are connected and disconnected by a compound movement of the article edges in a direction parallel to the general plane of said edges and in a direction perpendicular to said general plane. Another type is the head and socket fastener wherein the head is held in the socket by spring frictional engagement and the axis of the head and socket is generally perpendicular to the general plane of the edges of the article, and said edges must be overlapped to connect the heads and sockets while the heads and sockets must be moved in planes perpendicular to the general planes of the edges for connecting and disconnecting the heads and sockets. A third type is the so-called slide operated or zipper type which requires a slider for connecting and disconnecting the fastener elements. A fourth is the button and buttonhole type which requires overlapping of the edges of the article and insertion of the buttons through buttonholes.

The hook and eye type, the head and socket type and the button and buttonhole type have among other things the disadvantages of bulkiness and the forming of protuberances. Moreover, it is frequently difficult to connect and disconnect the complemental fasteners, and the complemental fasteners may become accidentally separated, the hooks and eyes when the edges of the article are not under tension and the heads and sockets when the edges are placed under too great a tension tending to separate them. Furthermore, the operation of connecting and disconnecting the complemental fasteners is slow and tedious. The zipper type causes puckering of the connected edges of the article, is frequently stiff due to the closely interlocking metal fasteners, and especially in tight fitting garments the slider is frequently difficult if not impossible to operate. Moreover, the zipper and hook and eye fasteners must be heavily padded or have a flap to prevent injury to the body or underclothing which adds to the bulkiness and cost of manufacture; furthermore, the slider causes an objectionable protuberance.

Therefore, a prime object of my invention is to provide a fastener embodying novel and improved features of construction which shall overcome the above-mentioned difficulties and disadvantages, which shall be thin or have minimum bulk, shall have the complemental fastener elements connectible in a single movement in the general planes of the connected edges and in directions approximately perpendicular to said edges with said edges in approximately abutting relation, which shall require no padding or protective flap or fly, and wherein the complemental fastener elements shall be positively locked against accidental disconnection.

Another object is to provide a flexible, easily operable fastener including complemental stud and socket elements which can be applied to the edges of pieces of material or articles to be connected so as to positively interlock with each other upon relative movement of said edges toward each other in their own planes, and so as to separate from each other upon relative rotation of said elements about axes perpendicular to said edges and parallel to the general plane of at least one piece of material, whereby to ensure easy and quick connection and disconnection of the complemental elements and positive locking together thereof against accidental separation.

Another object is to provide a fastener of the type including a stud element having a base and a shank formed with a lateral shoulder, and a socket element having opposed spring jaws to receive said shank between them and one having a recess, opening or catch to receive and interlock with said shoulder, said elements being constructed and arranged so as to be connectible by insertion of said stud between said jaws and cause positive interlock of said shoulder with said recess, and being disconnectible by relative rotation of said elements about an axis disposed longitudinally of said stud shank to rotate said shoulder out of said recess; and to provide in such a fastener a stud element that shall comprise a base having a shank and a novel and improved bulbous rigid head so constructed as to cooperate with the complemental socket element in a novel and improved manner to permit easy and secure interlocking of the stud element and socket element and yet allow said elements to be separated easily and quickly by simple relative rotation of the elements about an axis disposed longitudinally of the shank of the stud element.

Further objects are to provide a fastener of the character described wherein the complemental fastener elements shall have shoulders at opposite sides of the engaging portions, i. e., the stud and the recess of catch, to abut a line of stitching or a fold in the article or garment edge to evenly and widely distribute strains imposed on the elements; and to provide such a fastener which can be firmly secured to the respective edges of the article or garment at points in close proximity to said engaging portions to ensure the necessary relative rotation of the elements by manipulation of said edges and with a minimum of strain tending to dislocate or tear the fastener elements from the article or garment; and to provide a structure for such a fastener whereby to ensure that the stud shall properly engage the socket element and not become snagged or improperly caught therein.

A further object of the invention is to provide such a fastener embodying novel and improved features of construction whereby the complemental elements shall be small and flat to cause a minimum of protuberances on the edges of the article or articles carrying them, and at the same time shall be strong and durable.

Another object is to provide a fastener of the general character described wherein the socket element may be secured between plies of fabric secured together adjacent the edge of at least one ply and with the mouth of the socket element opening through a gap between the plies, and the socket element shall embody novel and improved features of construction for accurately guiding the head of the head of the stud element through the gap between the plies and fabric and into said mouth of the socket element, whereby the socket element shall be invisible and the gap shall be held open even after laundering of the fabric and difficulty in properly engaging the stud element with the socket element shall be reduced to the minimum.

Another object is to provide a socket element of this character which shall have a novel and improved guide for the head of the stud element that shall also serve to reenforce the socket element, and shall permit the element to be made thin and with a maximum of spring strength to effectually resist accidental disengagement of the stud element from the socket element under strains incident to use of the fastener.

A further object is to provide in a fastener of this character, a socket element having novel and improved means to cooperate with stitches for securing the socket element between plies of fabric and positively hold the socket element against turning and against displacement in such a manner as to throw the stud receiving opening out of alinement with the gap between the plies, and to hold the fabric flat and unwrinkled over the socket element; and thus to provide in such a socket element laterally projecting lugs to be traversed by stitches, whereby the element can be firmly secured between the fabric plies with a continuous straight line of stitches.

Another object is to provide such a socket element having the free edges of the jaws so formed as to prevent catching or snagging of said edges in the fabric plies and thereby ensure free movement of the laws between the plies, and to cause the jaws to be forced together with a wedge action between the fabric plies to tightly grip the stud element under forces applied to the socket element while the latter is connected to a stud element and the fastener is in use.

A further object is to provide in a fastener of the character described a novel and improved stud element so constructed as to conform to the curvature or angularity of the part over which the fastener is applied, for example, the curves of the body where the fastener is on a garment, or the angular corners of a piece of furniture where the fastener is used in a furniture cover, whereby to ensure a smooth, close joint between the connected edges of the garment or article and to reduce the application of strains to the fastener which might accidentally disconnect the complemental socket and stud elements.

Further objects are to provide a socket fastener of the general character described which shall include a novel and improved integral ornament to overlie a ply material beneath which the fastener is secured; and to provide such a fastener wherein said ornament shall be connected to the edge of the element in such a way as to cooperate with stitches for securing the element between plies of material.

Other objects, advantages and results of the invention will appear from the following description when read in conjunction with the accompanying drawings. The invention contemplates the attachment of the fastener elements either to tapes to be applied to the edges of a garment or other articles, or directly to the edges of the garment or other article, and in the drawings:

Figure 1 is a composite perspective view of the socket element and stud element of a separable fastener embodying my invention.

Figure 2 is a transverse sectional view through the socket element on the line 2—2 of Figure 1.

Figure 3 is a similar view on the line 3—3 of Figure 1.

Figure 4 is a transverse sectional view through the two complemental fastener elements connected together.

Figure 5 is a similar view showing the manner of separating the complemental fastener elements.

Figure 6 is a view similar to Figure 1 showing a modification of the fastener.

Figure 7 is a top plan view of the complemental socket element and stud element shown in Figure 6 connected together.

Figure 8 is a front elevation of the socket element shown in Figures 6 and 7.

Figure 9 is a transverse sectional view on the line 9—9 of Figures 6.

Figure 10 is a similar view on the line 10—10 of Figure 6.

Figure 11 is a plan view of another modified form of fastener.

Figure 12 is a front elevational view of the socket element shown in Figure 11.

Figure 13 is a transverse sectional view through the socket element shown in Figure 11 and a complemental stud element connected together.

Figure 14 is a perspective view of one side of a modified form of socket element showing it from its rear end.

Figure 15 is a similar view showing the socket element from the front end.

Figure 16 is a view similar to Figure 15 showing the opposite side of the fastener element.

Figure 17 is a front elevational view of the socket element.

Figure 18 is a rear elevational view thereof.

Figure 19 is a composite plan view of the complemental socket elements and stud elements of the fastener in separated condition and shown as attached to fabric tapes portions of which are broken away for clearness in illustration.

Figure 20 is a transverse vertical sectional view through the fastener shown in Figure 19 with the socket elements connected.

Figure 21 is a view similar to Figure 15 showing a further modification of the socket element.

Figure 22 is a detached perspective view of the stud element shown in Figures 19 and 20.

Figure 23 is a transverse vertical sectional view through a slightly modified form of the stud element part of the fastener.

Figure 24 is a composite perspective view of a further modification of the fastener wherein the stud element and socket element parts are disposed at right angles to each other as in a furniture cover, showing the fastener parts in a separated condition.

Figure 25 is a sectional top plan view of the fastener shown in Figure 24 with the parts connected together.

Figure 26 is a detached perspective view of the stud element shown in Figures 24 and 25.

Figures 27 and 28 are views similar to Figure 20 showing modified forms of the socket element.

Figure 29 is a fragmentary plan view of a tape similar to that shown in Figure 19 but illustrating a further modified form of socket element.

Figure 30 is a transverse vertical sectional view on the line 30—30 of Figure 29.

Figure 31 is a detached perspective view of another modified form of the socket element.

Figure 32 is a view similar to Figure 30 showing the socket element of Figure 31.

Figure 33 is a top plan view of a modified form of the stud element, and

Figure 34 is a sectional view thereof on the line 34—34 of Figure 33.

Referring to Figures 1 to 5 inclusive, the separable fastener includes a socket element A and a complemental stud element B. Each socket element is illustrated as comprising a single piece of spring sheet material folded upon itself at 1 to form a flat base having two opposed spring jaws 2 and 3 integrally connected at one end. As shown, the free edge of each jaw intermediate its side edges is formed with a tongue 4 which is especially designed to project through a gap between plies of fabric of an article to which the fasteners are connected. The free end portion of one jaw is bent at an angle to the general plane of the jaw to form flanges 5 which overlie the free end of the other jaw at opposite sides of the tongues 4 so as to form shoulders and eliminate thin or sharp edges. The bent portions or flanges 5 also, in conjunction with the tongues 4, define a mouth for the entrance of the complemental stud element between the jaws to direct the stud element into engagement with the walls of a recess, opening or catch 6 formed in one of the jaws.

The complemental stud element B comprises a flat base having a shank 7 rectangular in cross section and projecting from one edge thereof intermediate its ends and having two opposite flat sides 8 approximately parallel with the respective sides of the base and a bulbous or ball-like rigid head 70 formed with a shoulder 9 at one side projecting from one side of the shank at one side of the base and facing toward the base, the rounded surface of the head at the juncture or termination of the free edge of the shoulder at the shank being approximately flush with at least two opposite ones of the other sides of the shank.

In use, the fastener elements will be secured to the edge portions of a garment or article to be connected, for example as shown in my Patent No. 2,114,429 dated April 19, 1938, with the openings between the jaws of the socket elements facing toward one edge of the garment or article and the shank 7 of the stud element projecting from the other edge. In connecting the complemental stud elements and socket elements, the two elements are moved toward each other in their own planes so as to insert the shanks 7 between the jaws of the corresponding socket elements, the jaws being sprung apart as the stud shanks are inserted and then snapping over the shoulder 9 to cause interlocking engagement of the edges of the opening 6 with said shoulder. The stud elements and socket elements are thus positively interlocked with each other, and when thus connected together, the complemental stud elements and socket elements will effectually withstand all strains tending to pull them apart in their own planes.

The connection of the complemental elements can be effected easily and quickly, the tongues 4 effectually guiding the stud shanks between the jaws of the socket elements, and if desired the tongues may be transversely curved as at 10 (see Figure 8) or one of the tongues may have side flanges 11 (see Figure 12) to form in effect a mouth to accurately guide the stud shanks between the jaws. Flanges 11 and the edges 100 of the curved tongues as shown in Figure 8, also tend to limit compression of the jaws together and thereby insure adequate opening for insertion of the stud shanks.

The complemental socket elements and head elements are separable by relatively rotating them in directions at angles to the planes of their bases about an axis disposed longitudinally of the stud shank to rotate the shoulder 9 out of the recess 6, as clearly shown in Figure 5. The fastener elements when connected are held against such rotation by engagement of the jaws 2 and 3 with the flat sides 8 of the hook shanks.

Preferably the stud shank will be of a thickness and width approximately equal to the normal distance between the jaws 2 and 3 adjacent the opening 6, as shown in Figures 4 and 13, so that the spring jaws are not separated upon disconnection of the complemental elements; although the shank may have a width greater than said thickness and gradually increasing toward the base so as to engage and spread apart the jaws upon relative rotation of the elements to insure complete disengagement of the shoulder from the recess, as shown in Figure 5. When the shanks are of gradually increasing width, the spring action of the jaws on the edges of the shanks, as shown in Figure 5, will tend to eject the stud from between the jaws.

While I have shown one shoulder 9 on each stud element at one side thereof, another shoulder might be formed on the opposite side of the shank, and both jaws of the socket elements could be formed with openings or recesses, one for each shoulder on the stud shank.

A modification of the fastener is shown in Figures 6 to 10 inclusive wherein each socket element includes a single sheet of spring material folded upon itself and having a split tubular formation 12 at the fold to provide a maximum of resiliency for the opposed jaws 13 and 14. One jaw 14 is narrower than the others, is disposed intermediate the ends of the latter, and has a recess or opening 15 to cooperate with the shoulder of the complemental stud. The edge portions of the other jaw at opposite sides of the jaw 14 are returned upon the jaw as at 16 to form smooth or rounded shoulders 16a to abut the folds in the material or stitches in the article to which the fastener elements are attached, and also to reenforce the jaw. The jaw 13 also has openings 17 to receive attaching means such as stitches for securing the fastener element to an article, and the complemental stud element C has similar openings 18 in its base. The jaws 13 and 14 have integral tongues 19 corresponding to the tongues 4, and preferably the jaws are weakened as at 20 between the free edges thereof or the tongues and the recess or opening 15 so as to increase the resiliency of the edge portions or tongues and reduce spreading of the jaws upon relative lateral movement of the fastener elements in directions at angles to the planes of the jaws.

It will also be observed that the edges 21 of the return portions 16 also form a guide channel for the shank of the complemental stud element in a manner similar to that of the end of the flanges 5 of the form shown in Figure 1.

The operation of this form of the invention in connecting and disconnecting complemental fastener elements, is identical with that shown in Figures 1 to 5 inclusive.

It will be observed that in all forms of the invention the complemental elements have shoulders at opposite sides of the engagement portions, i. e., the stud shanks and recesses; that the fastener elements may be firmly secured to the edge portions of an article or garment as by stitches abutting said shoulders or passing through the openings 17 or 17a, at points closely adjacent said engaging portions; and that the studs and recesses interlock inwardly of the shoulders of the socket elements. This ensures firm attachment of the fastener elements to the article or garment so as to ensure proper relative rotation of the elements to separate them, as shown in my above-mentioned co-pending application, with a minimum of strain tending to tear or dislocate the elements from the article or garment.

Also, due to the shape and relation of the complemental elements, proper engagement of the studs and recesses is ensured, and snagging or improper catching of the studs in the socket elements is prevented; and the shoulder 9 of the stud is rounded to ensure complete disengagement thereof from the edge of the recess or opening 6 or 15 when the elements are relatively rotated.

Preferably the jaws of all forms of the socket element converge toward each other from the free ends, and the base of the stud element is of gradually decreasing thickness from the shank to the opposite edge, especially as shown in Figure 13, so as to form a minimum of protuberances on the article to which the fastener is attached.

Due to the construction and arrangement of my fastener elements, only light or small spring action is required in the jaws of the socket elements to hold the stud elements securely interlocked with the socket elements, so that the fastener elements may be small and flat to provide a minimum of bulkiness at the edges of the garment or article to which the fastener is attached. This is further advantageous in that during laundering, mangling, ironing or handling of the garments or articles, no obstructions are caused by the fastener elements. Furthermore, ironing of the garments or articles actually presses the jaws of the socket elements together, and shrinkage of the fabric due to washing causes the fabric to be drawn taut about the edges of the jaws to reduce possibility of the shanks of the studs being accidentally inserted between the fabric plies and the socket element.

It will be understood that the fastener elements may be secured to an article in any suitable manner, and may have any desired number of openings 17 and 17a to receive attaching means as shown in Figures 6 and 11.

A further modification of the fastener is shown in Figures 14 to 20 inclusive wherein the socket element comprises a single piece of spring sheet material folded upon itself as at 25 to form an approximately rectangular flat base having two opposed jaws 26 and 27 one of which has an opening, recess or catch 28 adjacent the free front edge of the jaw and intermediate its width, while the other jaw has a transverse groove or channel 29 comprising a corrugation which extends inwardly from the free edge of said jaw beyond the opening, recess or catch 28 in the other jaw to receive and guide the head or the complemental stud element into the recess or opening 28. This corrugation 29 also reenforces the jaw 27 against flexing between its free end and its juncture with the other jaw 26 so as to insure the spring action of the jaws occurring at the juncture 25 of the jaws and thereby provide maximum spring strength to effectually resist accidental disengagement of the stud element from the socket element under strains incident to use of the fastener. Also, the corrugation with the groove facing the other jaw provides a clearance or space for the stud element so that the main portions of the jaws may be arranged close together and thereby make the socket element of minimum thickness. Preferably one jaw 27 is narrower than the other, in other words, the side edges of the jaw 27 terminate short of the side edges of the jaw 26 as shown in Figure 14. Also at least one jaw, in the present instance the jaw 26, has a pair of lugs 30 projecting from the rear edge of the jaw in a common plane therewith, and if desired both ends of the jaw may have lugs as shown in Figure 21 where lugs 31 are shown at the front edge of the jaw 26 for the purpose about to be described.

It is also desirable that the portions of the front edges of the jaw 27 at opposite sides of the corrugation 29 recede longitudinally as at 32.

The socket elements are secured on the edges of the garment, tape or other article G between plies of fabric; for example as shown the socket elements are secured between the undersides of the garment edge portions or fabric strips G and other fabric strips 33. Preferably the socket elements are arranged in equidistantly spaced relation longitudinally of the edges of the garment, tape or other article with the openings between the jaws facing toward the edges and through openings or gaps between the plies of material. As shown in Figure 19, a line of stitches 34 runs longitudinally of said edge of the piece of material adjacent or in abutting relation to the front free edges of the jaws of the socket elements and penetrates the plies of the piece at opposite sides of the socket elements, said line of stitches preferably including superposed reenforcing stitches 35 at opposite sides of the groove or corrugation 29 of each socket element so as to leave a gap or opening 36 between the plies of the piece in alinement with said groove or channel 29 to receive the head of the complemental stud element. These stitches draw the plies of material tightly over the free front edges of the socket elements and the corrugation 29 maintains the gap in open condition even after laundering of the fabric material so as to constantly insure a free opening for the insertion of the head of the stud element.

Another line of stitches 37 runs longitudinally of the piece of material adjacent or in abutting relation to the rear end of each socket element and includes tying stitches 38 passing through the plies of material and traversing the lugs 30. In this way the socket elements are firmly secured in position between the plies of material against turning over and against sliding such as would throw the guide grooves 29 out of alinement with the corresponding gaps 36. Where the socket element has the lugs 31 at the free front edge of one jaw, the reenforcing stitches 35 traverse the lugs 31 and these lugs serve both to firmly secure the socket element against sliding or turning between the plies and also hold taut the material of the plies at opposite sides of the gap 36 so as to prevent loosening or buckling of the material of the plies at the gap in such a manner as to allow the stud element to enter between the socket element and the plies. If desired the lugs may be located on the sides of the jaws or socket element instead of on the ends thereof as shown and above described.

Due to the jaw 27 being narrower than the jaw 26, and also due to the lugs 30 and 31 in a common plane with the jaw 26, when the socket element is stitched between the plies of fabric, the plies are drawn about the socket element so that the plies overlying the wider jaw 26 are smooth and the socket element does not form a bulge or protuberance in the face ply. Substantially the entire bulge resulting from the fastener element is formed in the plies overlying the narrower jaw 27.

Each of the stud elements 40 includes a substantially flat base 41 formed of suitable material and having a shank 42 projecting from one edge thereof having flat sides 43 and a bulbous or ball-like rounded head 44 with a shoulder 45 projecting approximately perpendicular to the plane of the flat sides 43, the curved surfaces of the shoulder merging into the edges 46 of the shank. Also, the base 40 preferably has beveled edges 47 for the same reason that the jaw 27 of the socket element is narrower than the jaw 26. It will be seen that the stud element shown in Figures 14 to 19 inclusive is essentially the same as the stud element B shown in Figures 1, 4 and 5.

The bases of the stud elements are secured between the plies of the corresponding garment edge or tape D in any suitable manner, for example in the same manner as the socket elements are secured, the shanks of the stud elements projecting from the edge of the corresponding piece of material as clearly shown in Figures 19 and 20.

Each stud element is complemental to one socket element and in connecting the complemental stud elements and socket elements the edges of the respective pieces of material are moved edgewise toward each other so as to insert the heads of the stud elements between the jaws and in the grooves 29 of the corresponding socket elements, the jaws being sprung apart as said heads are inserted and then snapping over the shoulders 45 to cause interlocking engagement of the edges of the openings or catches 28 with the respective shoulders 45. Due to the relative narrowness of the jaws 27 and the receding front edges 32 of said part, the spring action of the jaws is free and unobstructed by frictional engagement of the front edges of the jaws with the fabric. The guide grooves 29 effectually guide the heads of the stud elements into the openings 28 and insure that said heads shall be properly engaged with the corresponding openings without danger of the heads being inserted between the jaws and the respective plies of material or inserted between the jaws out of alignment with respect to the openings 29. Preferably the shanks 42 of the stud elements will be disposed at angles to the planes of the respective bases 41 so that the socket element and stud element parts of the fastener may accurately conform to the curvature or angular formation of the surface with which the fastener contacts when in use, for example the curves of the body or the corners of a piece of furniture. For example, in Figures 19 and 20, the shanks of the stud elements are so disposed as to conform to the curves of the body as when the fastener is used in a corset, while in Figures 24 and 25, the shanks of the stud elements are approximately perpendicular to the corresponding bases so that the two complemental parts E and F of the fastener may be disposed perpendicularly to each other as in a corner joint of a furniture cover. In Figures 19 and 20 the stud elements are shaped to conform to a convex curve, but the elements may also be shaped to conform to a concave curve as shown in Figure 23. The shape of the stud elements as described has the further advantage in preventing such relative tilting of the fastener elements as would pry open or excessively spread the jaws of the socket elements under strains when the fastener is in use on curved or angular surfaces. Moreover, the structure insures a smooth joint between the two parts of the fastener.

The receding portions 32 of the edges of the jaws 27 permit the fabric to be more snugly drawn about the corrugation 29 and accurately shape the gap to receive the stud. For the purpose of preventing cutting of the fabric or stitches the free edge of the jaw 27 is preferably returned upon itself as at 48. This structure has an additional important function in that when the complemental fastener elements are connected together and the fasteners in use, the forces applied to the socket elements tending to separate the edges of the pieces of material will draw the free edges of the jaws 26 and 27 with a wedge action into engagement with the plies of fabric between which the socket elements are mounted, so as to tightly force the jaws into interlocking relation with the corresponding stud elements.

The complemental socket elements and stud elements may be separated in a continuous operation by oppositely directed forces on the edges of the pieces of material G and D from one end toward the other in directions at angles to the planes of said edges so as to rotate the socket elements relatively to the stud elements about axes parallel to the general plane of at least one piece or the axes of the shanks of the stud elements and remove the shoulders 45 of the stud elements out of the recesses 28 of the corresponding socket elements. This operation is in general the same as that shown in Figures 4 and 5. The separation of the fastener elements is further facilitated by the spring frictional engagement of the jaws with the tapered edges 46 of the stud shanks which tends to eject the studs from the socket elements after the shoulders 45 of the heads have been rotated out of the openings 28.

The fastener elements when connected are held against such rotation by the edge portions of the pieces of material G and D and engagement of the jaws 26 and 27 with the flat sides 43 of the stud shanks.

With the invention, it will be observed that when the fastener elements are connected, all metal is concealed and the edge portions of the two pieces of material G and D may be brought into tight abutting relation so as to avoid the necessity for an underlying flap with its disadvantages and annoyances.

Instead of forming the jaw of the socket element with an opening or recess 28, the jaw may have a tooth, lug or catch 50 stamped therefrom to engage the shoulders 45 of the stud element as shown in Figure 27. Furthermore, if desired the lug or catch to engage the stud element might be formed in the jaw 27 as indicated at 51 in Figure 28.

Another form of the socket element is shown in Figures 29 and 30 wherein the element is in general the same as the form shown in Figures 1 and 14 to 20 inclusive with the exception that the front free edge of the jaw 26 has an extension 52 projecting from between the plies of the piece of material and returned over the face ply. As shown, this extension comprises a crescent-shaped portion 53 connected to the jaw at opposite ends thereof by reduced neck portions 54. These neck portions serve in part the same purpose as the lugs 31 and are traversed by tying stitches 55 so as to more securely hold the socket element against turning over and sliding between the plies. The neck portions abut the edges of the corresponding plies and the return portion 53 lies against the outermost ply so as to hold the ply tightly against the main portion of the jaw 26 as clearly shown in Figure 30 and thereby add further protection against the possibility of the stud element being inserted between the fabric material and the jaw. As shown, the returned portion 53 may also serve as an ornament on the face of the garment, the shape of the portion 53 being variable as desired.

To further insure the maintenance of the gap in freely open condition between the plies of material to which the socket element is secured, the jaw 26 is provided at its free front edge with an upturned flange 56 in opposed relation to the groove 29 as shown in Figure 31. The material of the ply overlying the jaw 26 is drawn downwardly over the edge of the flange 56 as shown in Figure 32, and this combination insures against the head of the stud element being inserted between the jaw 26 and the ply of material overlying the jaw. The flange 56 also assists in maintaining the gap in wide open condition and cooperates with the groove or guide channel 29 in accurately and easily directing the head of the stud element between the jaws of the socket element and into the openings or catch 28. Referring to Figure 32, it will be observed that the lugs 31 hold the socket element against displacement out of alignment with the gap 36 which might otherwise occur as the result of the tension of the plies of material over the flange 56.

A modified form of the stud element is shown in Figures 33 and 34 wherein the element is formed of wire instead of one piece of sheet metal. As shown, the wire is folded upon itself at 57 and the end portions are shaped into a loop 58 to form the base of the stud. The shank 59 of the stud comprises two parallel sections of the wire which are preferably flattened and squeezed together to make the shank approximately rectangular in cross-section. The fold or bend in the wire at the outer end of the shank is shaped into a bulbous rigid head 60 as by upsetting and swaging of the wire, and the head has the shoulder 61 corresponding to the shoulders 9 and 45.

While I have shown the complemental stud and socket elements arranged plurally on a tape or the edge of an article or garment, it should be understood that a stud element and a complemental socket element may be used individually, for example on the ends of shoulder straps for ladies' garments, suspensory straps, and either between plies of material or secured upon one side of a piece of material.

It will be understood by those skilled in the art that the foregoing illustrates the now preferred embodiments of the invention, but that many modifications and changes may be made in the details of construction of the fastener elements without departing from the spirit or scope of the invention.

Having thus described my invention, what I claim is:

1. A socket element for a separable fastener comprising a substantially flat body having opposed spring jaws connected together at one end to receive the head of a complemental stud element between them, one of said jaws having a catch disposed inwardly of its free end to interlock with the head of such stud element and at least one of said jaws having a plurality of lugs projecting from its edge to be traversed by stitches for securing the element on a piece of material.

2. A socket element for a separable fastener comprising a substantially flat body having opposed spring jaws connected together at one end to receive the head of a complemental stud element between them, one of said jaws having a catch disposed inwardly of its free end to interlock with the head of such stud element, said socket element having a plurality of lugs projecting from its edges at opposite sides of said catch to be traversed by stitches for securing the element on a piece of material.

3. A socket element for a separable fastener comprising a substantially flat body having opposed spring jaws connected together at one end to receive the head of a complemental stud element between them, one of said jaws having a catch disposed inwardly of its free end to interlock with the head of such stud element, the free end of at least one jaw having a pair of lugs projecting forwardly therefrom, one at each side of said catch to be traversed by stitches for securing the element on a piece of material.

4. A socket element for a separable fastener comprising a substantially flat body having opposed spring jaws connected together at one end to receive the head of a complemental stud element between them, one of said jaws having a catch disposed inwardly of its free end to interlock with the head of such stud element, the free end of at least one jaw having a pair of lugs projecting forwardly therefrom, one at each side of said catch to be traversed by stitches for securing the element on a piece of material, and the socket element having a similar pair of lugs projecting from the end thereof opposite said free ends of the jaws.

5. The socket element set forth in claim 1 wherein the free end of the first-mentioned jaw has an out-turned flange between said lugs to cooperate with said groove for guiding the head of the stud element between said jaws and for holding open a gap between plies of material between which said socket element may be secured.

6. A socket element for a separable fastener comprising a substantially flat body having opposed spring jaws connected together at one end to receive the head of a complemental stud element between them, one of said jaws having a catch disposed inwardly of its free end to interlock with the head of such stud element, the free end of at least one jaw having a pair of lugs projecting forwardly therefrom in the plane thereof, one at each side of said catch to be traversed by stitches for securing the element on a piece of material, the free end of said one jaw having an out-turned flange for guiding the head of the stud element between said jaws and for holding open a gap between plies of material between which said socket element may be secured.

7. A socket element for a separable fastener comprising a substantially flat body having opposed spring jaws connected together at one end to receive the head of a complemental stud element between them, one of said jaws having a catch disposed inwardly of its free end to interlock with the head of such stud element, at least one jaw having an integral portion overlying the jaw in spaced relation thereto and connected to said jaw by narrow neck portions projecting integrally from the free edge of the jaw at opposite sides of said catch and returned upon the jaw.

8. A socket element for a separable fastener comprising a substantially flat body having opposed spring jaws connected together at one end to receive the head of a complemental stud element between their free ends, one of said jaws having a catch disposed inwardly of its free end to interlock with the head of such stud element and there being a corrugation in the other of said jaws forming a groove facing the first-mentioned jaw and leading inwardly from the free end of the jaw to a point beyond said catch.

9. A separable fastener including a stud element having an approximately flat base and a shank projecting from one edge of the base, the extremity of said shank being provided with a rigid head having a shoulder extending laterally from the shank at one side of the base and facing toward the base with its free edge curved transversely of the shank and with the surface of the head at the juncture of the free edge of said shoulder with the shank approximately flush with the sides of the shank, and an approximately flat spring socket element having opposed spring jaws connected together at one end with their other ends free to receive said shank and head of the stud element between them, at least one of said jaws having a catch spaced inwardly from the free end of the jaws to interlock with said shoulder on said stud element upon insertion of said shank between said jaws with the stud element and the socket element disposed in a certain relation to each other, said shank of the stud element being narrow so as to be rotatable about its longitudinal axis while between said jaws relative to said socket element to rotate said shoulder of the stud element out of engagement with said catch and permit the shank to slide outwardly from between the jaws of the socket element and separate said elements, and the free end of at least one of said jaws forming straight elongate shoulders on the socket element at opposite sides of the catch to abut a line of stitches or a fold in an article to which the socket element is to be attached.

10. A separable fastener including a stud element having an approximately flat base and a shank projecting from one edge of the base, the extremity of said shank being provided with a rigid head having a shoulder extending laterally from the shank at one side of the base and facing toward the base with its free edge curved transversely of the shank and with the surface of the head at the juncture of the free edge of said shoulder with the shank approximately flush with the sides of the shank, and an approximately flat spring socket element having opposed spring jaws connected together at one end with their other ends free to receive said shank and head of the stud element between them, at least one of said jaws having a catch spaced inwardly from the free end of the jaw to interlock with said shoulder on said stud element upon insertion of said shank between said jaws with the stud element and the socket element disposed in a certain relation to each other, said shank of the stud element being narrow so as to be rotatable about its longitudinal axis while between said jaws relative to said socket element to rotate said shoulder of the stud element out of engagement with said catch and permit the shank to slide outwardly from between the jaws of the socket element and separate said elements, and at least one jaw of said socket element having flanges at and spaced along its free end and extending toward the other jaw to form between them a guide opening for the shank and head of the stud element in line with said catch.

LEO ROSEMAN.